United States Patent Office 2,700,857
Patented Feb. 1, 1955

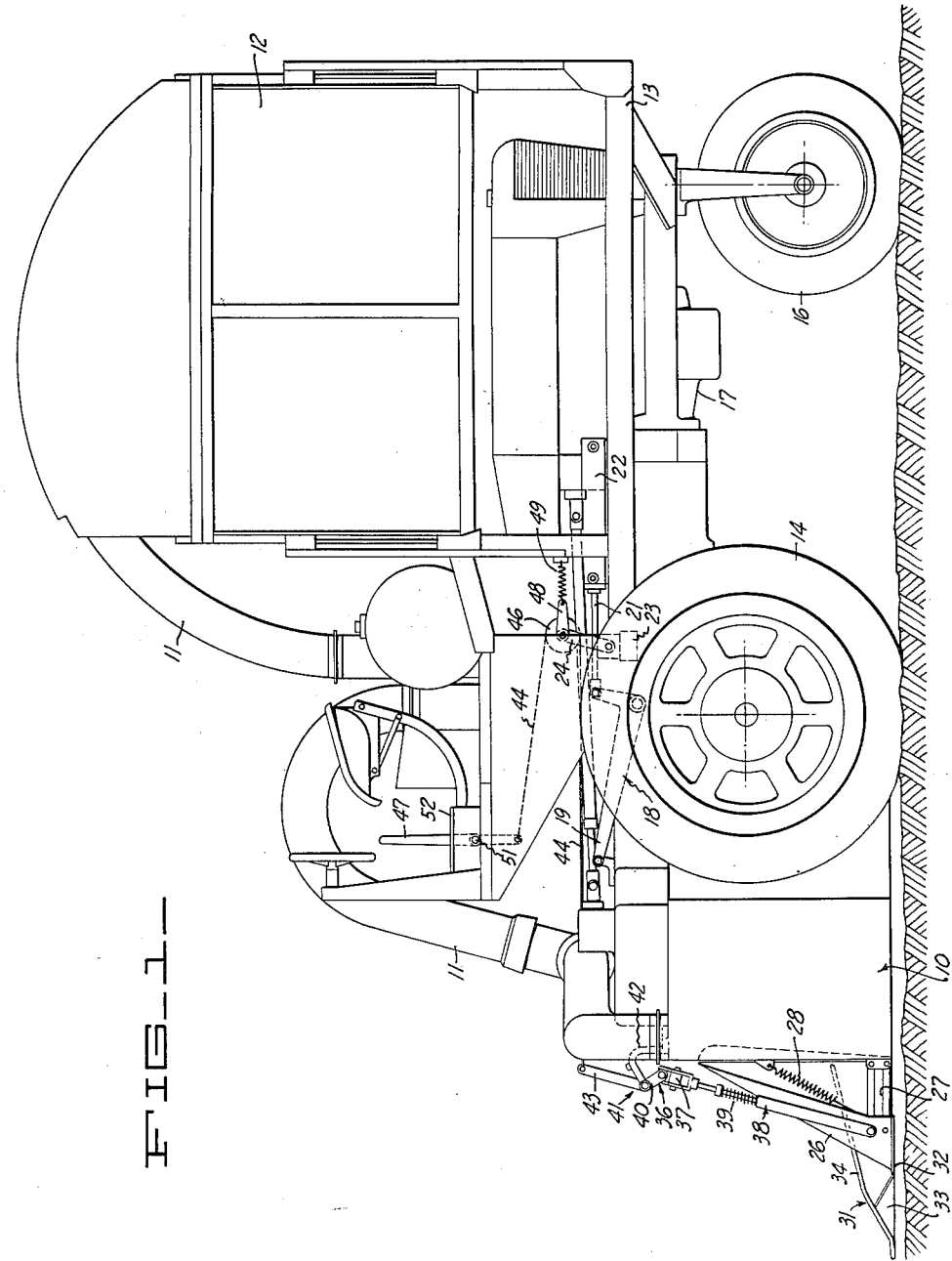

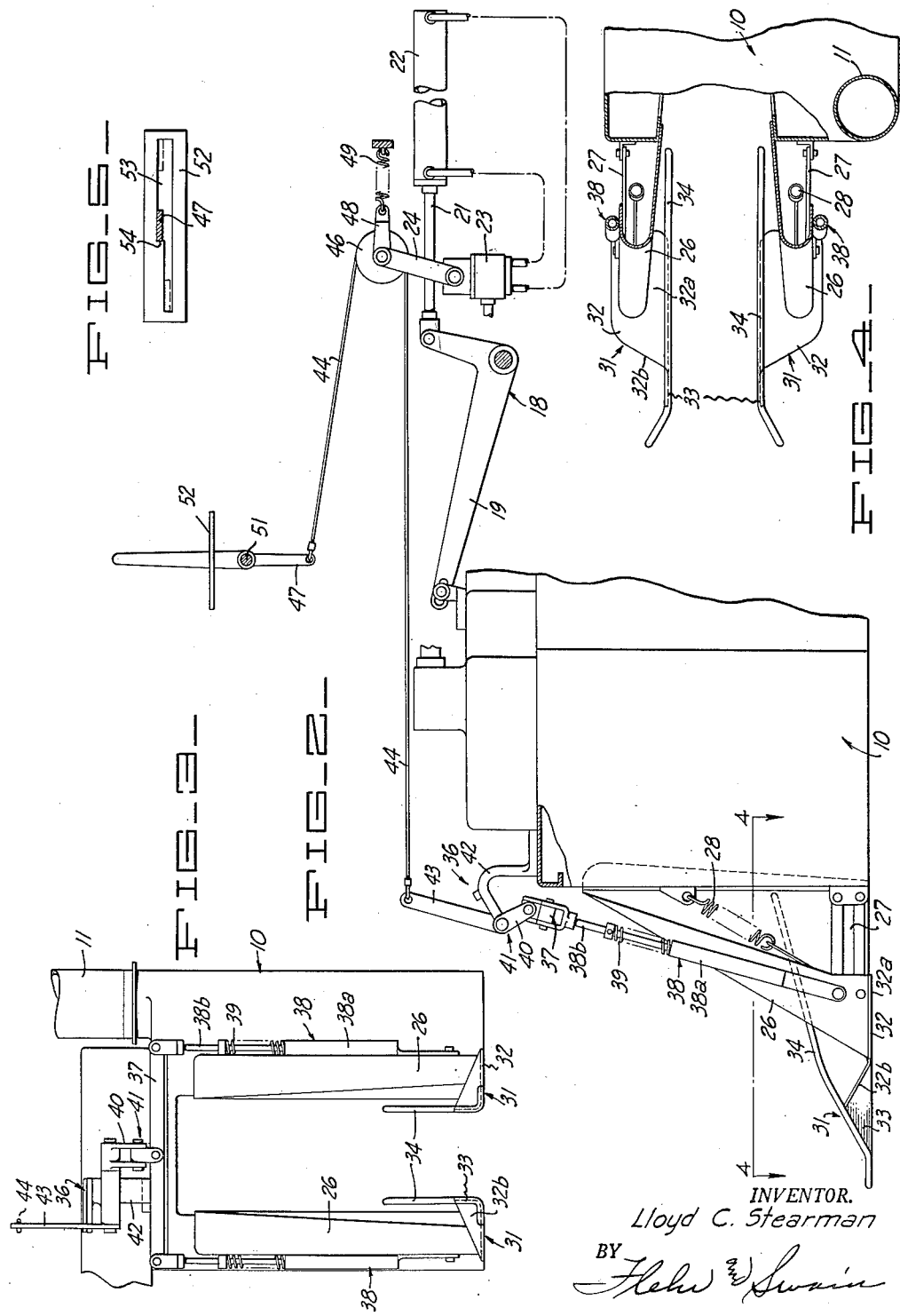

2,700,857

COTTON PICKER WITH AUTOMATIC ADJUSTING MEANS

Lloyd C. Stearman, Dos Palos, Calif., assignor to Stearman-Hamel, Inc., Dos Palos, Calif., a corporation of California Application November 20, 1950, Serial No. 196,566

4 Claims. (Cl. 56—11)

This invention relates to cotton picking apparatus and particularly to a guide control device adapted to be used in conjunction therewith.

As is well known to those skilled in the art of the mechanical picking of cotton, that portion of the device which consists generally of the rotating barbed spindles which pick the cotton from the plant must be maintained in proper position with respect to the plant from which the cotton is being picked. Specifically, the entire apparatus must be steered in such a manner that the cotton plant is fed properly into the machine and must be guided at the proper elevation from the ground in order that all of the bolls will be fed into the device and the cotton removed from them.

It is the principal object of this invention to provide suitable means for maintaining the revolving picker drums of a conventional cotton picking device at the proper height from the ground in order that the picker drums will be maintained at the proper elevation with respect to the individual plants to pick all the cotton and in order that they may be so spaced from the ground at all times that clods of dirt, sticks and other foreign matter will not enter the picker drums.

Other objects and advantages of the present invention will appear from the following specification taken in conjunction with the accompanying drawings in which:

Figure 1 is a side elevational view illustrating a conventional cotton picking machine to the front of which my device has been mounted;

Figure 2 presents a diagrammatic view of the device illustrated in Figure 1 showing the manner in which my device is adapted to be secured thereto and to operate the conventional parts thereof;

Figure 3 is a fragmentary front elevational view on an enlarged scale of my device;

Figure 4 is a cross sectional view taken along the line 4—4 of Figure 2; and

Figure 5 is an enlarged view with parts broken away and shown in section of a lever control mechanism.

As illustrated in Figure 1, the conventional cotton picker consists of a plurality of revolving picker drums 10 which contain the barbed spindles which pick the cotton from the plant on each side of a row of plants. The cotton is removed from the spindles by rubber doffers, not shown, and is then conveyed by an air conveyor system from the bottom of the picking chamber in a revolving drum 10 through the tubular members 11 into the cotton retaining basket 12.

The entire apparatus is mounted upon a substantially conventional tractor assembly 13 which is mounted upon a pair of driving wheels 14 and a steering wheel 16. The entire assembly is driven by a suitable internal combustion engine 17. The picker drum 10 is mounted upon the frame of the tractor 13. The means for mounting the same consists generally of a cross member 18 which is suitably secured to the frame 10 and upon which there are pivotaly mounted bell crank members 19, from the forward ends of which the drum 10 may be suspended. The rear ends of the bell crank arms 19 are secured to piston 21 which is actuated by a hydraulic cylinder 22. The means for causing operation of the hydraulic cylinder 22 consists generally of a suitable valve 23 which governs the introduction of hydraulic fluid under pressure into the cylinder 22. The valve 23 in turn is operated by a handle 24 and, as illustrated in Figure 2, when the handle 24 is swung to the left, as viewed in Figure 2, fluid is introduced into the forward end of the cylinder 22 with the result that the piston 21 is retracted and the drum 10 is raised. When the handle 24 is swung to the right as viewed in Figure 2, hydraulic fluid under pressure is released from the forward end of the cylinder 22 and the piston 21 allowed to move to extended position with the result that the drum 10 is lowered by gravity.

My guide device for determining the proper elevation of the picker drums 10 consists generally of a pair of vertical gathering shields 26 which are mounted in front of the picker drums 10 and movably secured thereto by a pair of double arms 27 at their lower ends. The arms 27 provide a parallelogram attachment for the shields 26 and permit their vertical movement. A spring 28, the lower end of which is secured to the gathering shields 26 near their forward ends and the upper end of which is secured to the picker drums, serves to maintain most of the weight of the shields.

Attached to the lower edge of and extending outwardly in front of the gathering shields 26, I have provided a pair of ground engaging shoes 31. The shoes 31 consist generaly of a scuff plate 32, one portion 32a of which is flat and adapted to engage the ground and the forward portion 32b of which is turned upwardly to provide a sled or skid-like leading edge for the shoe 31. Along the forward inner edge of portion 32b I have secured a vertical web 33. The web 33 extends outwardly in front of the plate 32 generally as shown and provides a base for a rod-like guide member 34. The guide member 34 is rounded at its forward end and is bent slightly as indicated to provide a further gathering angle to guide plants into the picker drums.

The upturned sled-like or skid-like portion 32b provides a surface which is adapted to advance over rough terrain and which is adapted to contact and ride over any clods, sticks, or rocks. The vertical web 33 prevents any clods, sticks, stones or other foregin matter which might normally be pushed inwardly by the shoe 32 into the path of the picker drums. In addition the shoes level the ground on each side of the cotton row, allowing the drum or picking head to be operated in a lower position than normal. This allows the picking mechanism to pick the lowest bolls on the plant. In effect, therefore, the walls 32b and 33 form advancing surfaces which have a sled and angle-dozer action and either ride over foreign matter or urge it to one side.

It will be apparent from the foregoing that as the lower surface of the shoe 32 engages the ground it will be raised or lowered with respect to the picker drum 10 ahead of which it is being advanced. Normally, however, the vertical movement of the gathering shields 26 and the shoes 31 would have no effect upon the picker drums 10. However, I have provided a means for translating the vertical movement of the gathering shield 26 to the picker drums 10 in such a manner that the picker drums 10 will be raised or lowered in accordance with the raising or lowering of the gathering shields 26 by the level of the terrain over which the shoe 32 is being advanced.

It will be noted that I have provided a yoke arrangement 36 which consists generally of a cross-arm 37 from which a pair of members 38 extend. The lower ends of members 38 are secured to the gathering shield 26 as indicated. The downwardly extending members 38 are lost motion members and in this connection I have provided a tubular member 38a within which the rod-like member 38b is adapted to receiprocate. A spring 39 about the rod 38b engages the upper end of the tubular member 38a. The cross-bar 37 is secured to arm 40 of a crank assembly 41 which is pivotally mounted upon a bracket 42 which in turn is mounted upon the picker drum 10. The other arm 43 is secured to a cable 44 which is reeved about a pulley 46 upon the actuating end of the lever 24 and which terminates or dead ends at a second control lever 47.

The valve actuating lever 24 is also provided with a link 48 and spring 49 which normally urge the same to the right (as viewed in Figure 2) or lowered position.

The control lever 47 to which the cable 44 is secured is pivotally mounted at 51 upon the frame of the tractor 13 and passes through a plate 52 which is provided with a slot 53 having a step 54. The entire apparatus is so assembled that when the lever 47 is moved to the extreme rear of the slot 53, the lever 24 is brought forward with the result that the drum 10 is raised. When the lever 47 is in the middle position at which it engages the step 54, the device may be said to be in neutral position and the drum 10 is in a median or normal position. When the lever 47 is at the extreme forward position, the arm 24 is urged to the right by spring 49, with the result that the picker drum 10 is lowered.

Operation of the device may briefly be described as follows: Let it be assumed that the operator of the cotton picker upon which my invention has been mounted wishes automatic raising and lowering of the picker drum 10. The handle 47 is then put to the forward position. When the lever 47 is in this position, the spring 49 normally urges the lever 24 to the right, as viewed in Figure 2. As has previously been pointed out, when the lever 24 is at the rearward position, the picker drum 10 is at a normal operating position and the shoes 31 are in engagement with the ground.

As the entire apparatus advances over the terrain the lower surfaces of the shoes 31 will engage the surface of the ground. If the surface of the ground is such that the shoe 31 and the gathering shield 26 are raised, the upward movement of the shields 26 is communicated, through the side elements 38 and the cross-bar 37 to the crank 41 which, it will be recalled, is pivotally mounted upon a bracket 42. As the arm 40 swings upwardly, as viewed in Figure 2, arm 43 is swung forwardly with the result that the cable 44, which is dead-ended upon the lever 47 will draw the lever 24 forwardly thereby introducing fluid into the forward end of the cylinder 22, raising the picker drum 10. As the picker drum 10 is raised, the shoes 31 continue to engage the ground. However, it will be noted that as the picker drum is raised, the bracket 42 is likewise raised with the result that, with upward movement of the bracket 42, the pivot point of the crank 41 is also raised which will result in a relative downward swinging of the arm 40. Relative downward swinging of the arm 40 relaxes the tension of the cable 44 with the result that the introduction of further fluid into the piston 22 is prevented.

Should the lower surface of the shoe 31 engage a depression in the ground, the weight of the members 26 and 31 will be received by the yoke 38 with the result that the crank 41 will be swung downwardly about its pivot and the lever 43 moved to the right, as viewed in Figure 2. This will in turn result in a slacking off of the tension of the cable 44 and because of spring 49 lever 24 will be swung to the right. As has previously been indicated this results in a bleeding off of the hydraulic fluid in the forward end of the cylinder 22 and a lowering of the picker drum 10.

It will be obvious from the foregoing that I have provided a fully automatic and simplified apparatus for maintaining the picker drums of a cotton picking machine at the proper or predetermined desired level with respect to the ground. As the device approaches a hill or hummock, the shoes 31 first engage the same with the result that the gathering shields are raised, and through the yoke 36, the levers 40 and 43 and the cable 44, valve 23 and cylinder 22, the picker drum is raised. Should the device approach a depression, the shoes 31 will follow the contour of the ground with the result, as previously indicated, that the picker drum will likewise be lowered. In this manner the picker drums will always be retained at the proper distance from the ground to pick all of the cotton upon a plant. In the same manner the picker drums will also be maintained a sufficient distance from the ground that sticks, clods, stones and other foreign material will not be gathered therewithin. This not only results in cleaner and more complete picking of the cotton but it also prevents damage, unnecessary wear and tear and deterioration of the device.

I claim:
1. In a cotton picking machine, a framework having ground engaging wheels, a vertically adjustable picker mechanism mounted on said framework, a pair of ground traversing shields mounted on said picker mechanism, means responsive to the vertical movement of said gathering shieuds for adjusting the vertical position of said picker mechanism with respect to the ground, said means comprising a hydraulic ram mounted on said frame, a link mechanism connected to said picker mechanism and said ram to move said picker mechanism upon actuation of said ram, a source of hydraulic fluid under pressure connected to said ram, a valve connected to said source of hydraulic fluid and said ram to determine the flow of fluid into said ram, and a linkage mechanism connected to said valve and said shields whereby said ram is actuated to positively raise or lower said picker mechanism upon vertical movement of said shields.

2. A device as in claim 1 together with means for selecting automatic or manual operation of said valve.

3. In a cotton picking machine, a framework having ground engaging wheels, a vertically adjustable picker mechanism mounted on said framework, a pair of ground traversing shields mounted on said picker mechanism, means responsive to the vertical movement of said shields for adjusting the vertical position of said picker mechanism with respect to the ground, said means comprising a hydraulic ram mounted on said frame, a linkage mechanism connected to said picker mechanism and said ram to move said picker mechanism upon actuation of said ram, a source of hydraulic fluid under pressure connected to said ram, a pilot valve connected to said source of hydraulic fluid and said ram to determine the flow of fluid into said ram, a linkage mechanism including a looped cable connected to said valve and said shields whereby said ram is actuated to positively raise or lower said picker mechanism upon vertical movement of said shields, means connected to said valve for selecting manual or automatic operation of said valve, said means comprising a lever movable between raise, lower and automatic positions to selectively position the end of said loop cable which is not attached to said ground traversing shields.

4. In a cotton picking machine, a framework having ground engaging wheels, a vertically adjustable picker mechanism mounted on said framework, a pair of ground traversing shields mounted on said picker mechanism, means responsive to the vertical movement of said shields for adjusting the vertical position of said picker mechanism with respect to the ground, said means comprising a tubular member pivotally attached to said shields, a rod movably mounted within said tubular member, a spring on said rod, a cross arm pivotally mounted on said rod, a first arm pivotally mounted on said cross arm, a supporting bracket pivotally connected to said arm, a second arm pivotally connected to said bracket and said first arm, a valve mounted on said frame, a pulley pivotally mounted on said valve, a cable fixed to said second arm and passing around said pulley, a control lever fixed to the other end of said cable, a plate mounted on said frame and associated with said lever for retaining said lever in predetermined positions, a source of fluid under pressure connected to said valve, a hydraulic ram connected to said valve, and means connected to said ram and to said picker mechanism for raising or lowering the picker mechanism upon actuation of said ram.

References Cited in the file of this patent

UNITED STATES PATENTS

| 2,023,491 | Rust et al. | Dec. 10, 1935 |
| 2,247,687 | Johnston | July 1, 1941 |
| 2,433,799 | Walz et al. | Dec. 30, 1947 |
| 2,514,764 | Herigstad | July 11, 1950 |